(No Model.)
G. W. WICKS.
MANUFACTURING PLUMBERS' TRAPS.
No. 359,756. Patented Mar. 22, 1887.
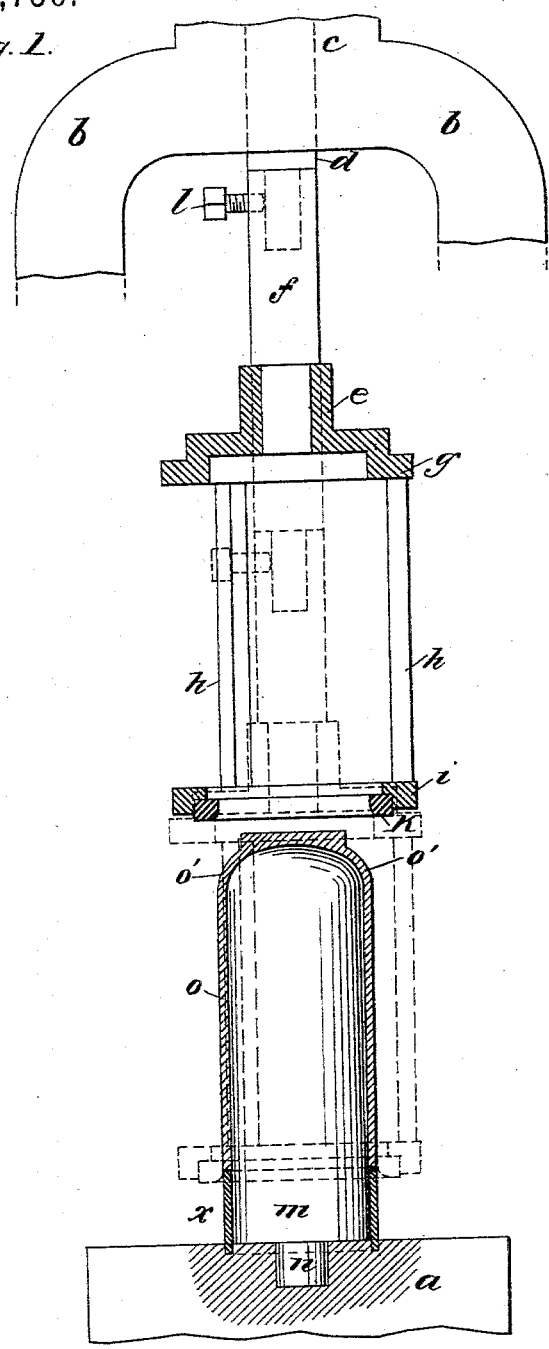
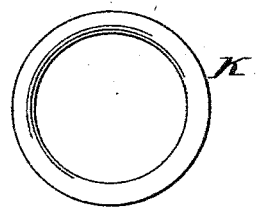
WITNESSES:
H. F. Parker.
Benjamin Miller.
INVENTOR
George W. Wicks,
BY
J. Ell Bowen
ATTORNEY.

UNITED STATES PATENT OFFICE.

GEORGE W. WICKS, OF BROOKLYN, NEW YORK, ASSIGNOR TO ARCHIBALD E. McKECHNIE, OF LYNN, MASSACHUSETTS.

MANUFACTURING PLUMBERS' TRAPS.

SPECIFICATION forming part of Letters Patent No. 359,756, dated March 22, 1887.

Application filed August 13, 1886. Serial No. 210,840. (No model.)

*To all whom it may concern:*

Be it known that I, GEORGE W. WICKS, a citizen of the United States, and a resident of Brooklyn, in the county of Kings and State of New York, have invented certain new and useful Improvements in Manufacturing Plumbers' Traps, of which the following is a specification.

This invention has reference to the manufacture of plumbers' traps of the type comprising an elongated cylindrical soft-metal vessel having a contracted mouth provided with a female screw-threaded hard-metal nut adapted to receive a screw-threaded hard-metal cover.

The type of trap in question—the body portion thereof—is usually formed by hand, which method of manufacturing the same is not only expensive, but, owing to the objectionable solder-joints incident thereto, oftentimes results in the production of unreliable work.

I have devised a method and a set of apparatus for making this style of trap, whereby I am enabled to produce a superior article by machinery at greatly reduced cost. These inventions I have embodied in applications for patents, which have been duly filed in the United States Patent Office, and they comprise a casting apparatus adapted to produce the soft-metal trap-body, an apparatus for shaping the neck of the trap and securing therein the female screw-threaded hard-metal nut, and a method or mode of operation by which the surface of the trap-body is rendered homogeneous and free from porosity, and at the same time more smoothly finished than the hand-made trap or the ordinary cast trap.

The object of my present invention is to produce a trap of the type referred to, having a body of a highly-finished appearance, and of a consolidated texture; and to that end the invention consists in casting the trap-body with its mouth of the same internal and external circumference as the rest of the body of the vessel, and then subjecting said casting to a mechanical drawing manipulation to increase its length and render its surface dense and polished.

It further consists in certain other novel features, as specified in the claims.

In the accompanying drawings, which form a part of this specification, Figure 1 represents in a vertical central elevation, partly in section, means for practicing my invention; and Fig. 2 is a detached view of the drawing-tool.

Referring to the drawings, the letter *a* represents the base of a screw-press of any suitable type, and of sufficient strength, and *b* the arms or standards which connect the head *c* of the press with its base. The plan by which the press is constructed is not important, and although a screw-press is preferred other forms of presses may be utilized in carrying out my invention.

The letter *d* is designed to represent the screw, which may be provided with a handle for operating the same by manual power; but my purpose is to have connected therewith suitable gearing, whereby the press may be operated by steam or other motive power. These details form no part of my invention, and are not therefore illustrated or further described.

Secured to the screw *d* in any suitable manner is the frame *e*, which comprises, among other parts, the connecting-rod *f* and ring *g*. To the ring *g* are secured two or more depending rods, *h*, which carry at their lower end a frame, *i*, with a groove or depression on its inner circumference for the reception of the hard-metal drawing-tool *k*. By this means the ring or tool *k* is maintained in a fixed position throughout the drawing operation.

The rod *f* is secured to the lower end of the screw *d* by the set-screw *l*, or by any other suitable means that will insure a positive connection between the screw of the press and the frame that carries the drawing implement.

The letter *m* designates a mandrel of cast-iron, having at its bottom a projection, *n*, which fits into a depression in the top of the bed *a* of the press, thereby holding the mandrel against lateral displacement. The steel ring *x* serves as a gage to regulate the length of the drawing process. The top of mandrel *m* is convex, while its body is cylindrical, and tapers slightly from top to bottom.

The letter *o* indicates a soft-metal trap in position on the mandrel *m* for being operated upon.

In the apparatus embodied in the applications for patents herein referred to is embraced means for casting the trap-body of the form shown in the annexed drawings, with a flat bottom of a circumference less than that of the circumference of the body of the trap, and with the mouth or open end of the vessel of the same internal and external circumference as the rest of the body of the vessel. I have also shown in said applications apparatus whereby the open mouth of the cast vessel just defined is fashioned into a neck of restricted diameter, and the mouth of the latter is provided with a hard-metal screw-threaded nut for the reception of a screw-threaded cap or cover.

In practice I shall cast the trap-body $o$ about an inch and a half (more or less) shorter in length than the finished trap will be. As thus cast, it is removed from the casting apparatus and placed bottom upward upon the hard-metal mandrel $m$, which is adjusted in position on the press. The interior surface of the bottom of the trap-body being concave, the top of the mandrel $m$ is accordingly made convex, and the circumference of the mandrel throughout is such as to enable the trap-body to be placed in position on the mandrel with ease. The mandrel $m$ is several inches longer than the trap-body when the latter is removed from the casting apparatus, in order that the requisite elongation may be given to the body of the trap in the drawing process. As the screw $d$ is fed downward by the application of the requisite power the inner circumference of the drawing tool or ring $k$ impinges upon the cast trap-body at the points $o'$ $o'$, and a continuation of the downward movement of the drawing-tool and its frame results in the compression and drawing of the soft-metal body of the trap from the points $o'$ $o'$, and consequent elongation of the length of said soft-metal vessel. The walls of the vessel are by this process rendered dense and homogeneous, and with a polished external appearance, closely resembling a hydraulic-drawn soft-metal tube.

The exact extent to which the body of the trap is to be elongated by drawing in the manner explained will be governed by the length of the casting and the depth the finished trap is to measure, and the degree of effect of the drawing-tool $k$ upon the trap's surface will obviously depend upon the relative diameters of the cast vessel and operating-surface of said drawing-tool.

When the trap-body $o$ has been subjected to the drawing manipulation above defined, it is removed from the mandrel $m$, the frame of the drawing-tool being elevated by reversing the operating mechanism to permit that to be done, and the fashioning of the neck and securing therein of the female nut are performed, by preference, by the mechanism heretofore referred to as being embodied in another application for a patent, and which comprises a series of rollers suitably mounted so as to revolve upon their own axes while moving bodily around a follower which is employed to maintain the trap to be operated upon in a fixed position. These rollers are so shaped upon their surface as to give the required finish and form to the neck of the trap, and as they move around the follower they are slowly fed downward by suitable mechanism. The application for patent which describes this mouth-shaping mechanism was filed in the United States Patent Office August 11, 1886, and bears Serial No. 210,658, and reference is made thereto for a more complete description of this feature of my improvement.

By this invention I am enabled to insure the production of a more desirable and reliable trap of the type illustrated than any heretofore produced either by hand or machinery, as I not only obtain lighter vessels of the standard sizes, but vessels absolutely free from defects due to blow-holes or the natural porosity of the metal.

Having thus described my invention, what I claim as new, and desire to secure by Letters Patent, is—

1. An improvement in the art of manufacturing soft-metal plumbers' traps of the type comprising an elongated cylindrical vessel, consisting in casting the trap-body with its mouth of the same diameter as the rest of the cylinder, and then subjecting the entire circumference of said casting to a drawing manipulation, whereby its length is increased and its surface compressed, polished, and rendered free from porosity, substantially as set forth.

2. The method of manufacturing soft-metal plumbers' traps of the type comprising an elongated cylindrical vessel, which consists in casting the trap-body with the diameter of its mouth corresponding to that of the rest of the cylinder, then elongating the said casting by subjecting the same to the action of a hard-metal drawing implement, and then fashioning the neck of the vessel by pressure applied through the instrumentality of a set of suitably-shaped hard-metal rollers, substantially as set forth.

3. In combination with a suitable press, the mandrel $m$, drawing implement $k$, and a suitable frame for guiding the latter, substantially as set forth.

4. The mandrel $m$, drawing implement $k$, and its guiding and supporting frame $g$ $h$ $i$, combined with a suitable power-press, substantially as set forth.

Signed at New York, in the county of New York and State of New York, this 19th day of July, A. D. 1886.

GEO. W. WICKS.

Witnesses:
J. E. M. BOWEN,
HUGO KOELKER.